US010264452B2

(12) United States Patent
Yang et al.

(10) Patent No.: US 10,264,452 B2
(45) Date of Patent: Apr. 16, 2019

(54) ENFORCING SERVICE POLICIES IN EMBEDDED UICCS

(71) Applicant: Apple Inc., Cupertino, CA (US)

(72) Inventors: Xiangying Yang, Cupertino, CA (US); Li Li, Los Altos, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/944,738

(22) Filed: Apr. 3, 2018

(65) Prior Publication Data

US 2018/0295511 A1 Oct. 11, 2018

Related U.S. Application Data

(63) Continuation of application No. 14/831,819, filed on Aug. 20, 2015, now Pat. No. 9,942,755.

(Continued)

(51) Int. Cl.
| | |
|---|---|
| *H04W 4/50* | (2018.01) |
| *H04W 4/60* | (2018.01) |
| *H04W 12/06* | (2009.01) |
| *H04W 12/08* | (2009.01) |
| *H04L 9/32* | (2006.01) |
| *G06F 21/32* | (2013.01) |

(52) U.S. Cl.
CPC .......... *H04W 12/06* (2013.01); *G06F 21/32* (2013.01); *H04L 9/3231* (2013.01); *H04L 9/3271* (2013.01); *H04W 4/50* (2018.02); *H04W 4/60* (2018.02); *H04W 12/08* (2013.01); *H04L 2209/80* (2013.01)

(58) Field of Classification Search
CPC ........ H04L 63/20; H04W 12/06; H04W 4/02; H04W 12/08; H04W 12/12
See application file for complete search history.

(56) References Cited

U.S. PATENT DOCUMENTS

| | | |
|---|---|---|
| 9,942,755 B2 | 4/2018 | Yang et al. |
| 2007/0092082 A1* | 4/2007 | Rush ................. G06F 21/10 380/277 |

(Continued)

OTHER PUBLICATIONS

PCT Application No. PCT/US2015/046052—International Search Report and Written Opinion dated Mar. 14, 2016.

(Continued)

*Primary Examiner* — Dung Hong
(74) *Attorney, Agent, or Firm* — Dickinson Wright RLLP

(57) ABSTRACT

The embodiments set forth techniques for an embedded Universal Integrated Circuit Card (eUICC) to conditionally require, when performing management operations in association with electronic Subscriber Identity Modules (eSIMs), human-based authentication. The eUICC receives a request to perform a management operation in association with an eSIM. In response, the eUICC determines whether a policy being enforced by the eUICC indicates that a human-based authentication is required prior to performing the management operation. Next, the eUICC causes the mobile device to prompt a user of the mobile device to carry out the human-based authentication. The management operation is then performed or ignored in accordance with results of the human-based authentication.

20 Claims, 11 Drawing Sheets

Related U.S. Application Data

(60) Provisional application No. 62/117,404, filed on Feb. 17, 2015, provisional application No. 62/041,613, filed on Aug. 25, 2014.

(56) References Cited

U.S. PATENT DOCUMENTS

| | | | |
|---|---|---|---|
| 2008/0003980 A1* | 1/2008 | Voss | H04L 63/0853 455/411 |
| 2008/0005577 A1* | 1/2008 | Rager | G06F 21/575 713/183 |
| 2008/0090614 A1* | 4/2008 | Sicher | H04W 8/205 455/558 |
| 2009/0061934 A1* | 3/2009 | Hauck | H04W 8/265 455/558 |
| 2009/0181662 A1* | 7/2009 | Fleischman | H04W 8/183 455/419 |
| 2009/0191846 A1* | 7/2009 | Shi | G06F 21/32 455/411 |
| 2009/0191918 A1* | 7/2009 | Mardiks | H04W 8/265 455/558 |
| 2009/0270126 A1* | 10/2009 | Liu | G06F 21/88 455/558 |
| 2009/0305668 A1 | 12/2009 | Ahn et al. | |
| 2010/0035577 A1* | 2/2010 | Rager | H04L 63/1466 455/411 |
| 2010/0090831 A1* | 4/2010 | Zhao | G06K 7/0008 340/572.1 |
| 2010/0169660 A1* | 7/2010 | Voss | H04L 63/06 713/183 |
| 2010/0330968 A1* | 12/2010 | Pecen | H04M 1/675 455/414.1 |
| 2011/0151835 A1* | 6/2011 | Velusamy | H04L 63/0861 455/411 |
| 2012/0108204 A1* | 5/2012 | Schell | H04W 8/205 455/411 |
| 2012/0260095 A1* | 10/2012 | Von Hauck | H04L 9/3228 713/176 |
| 2012/0289197 A1* | 11/2012 | Holtmanns | H04W 8/183 455/411 |
| 2012/0331292 A1* | 12/2012 | Haggerty | H04L 63/0272 713/168 |
| 2013/0210388 A1 | 8/2013 | Li et al. | |
| 2013/0231087 A1* | 9/2013 | O'Leary | H04W 8/22 455/411 |
| 2014/0045459 A1* | 2/2014 | Hjelm | H04L 63/0861 455/411 |
| 2014/0045460 A1* | 2/2014 | Park | H04W 8/205 455/411 |
| 2014/0086177 A1 | 3/2014 | Adjakple et al. | |
| 2014/0087790 A1* | 3/2014 | Babbage | H04W 8/183 455/558 |
| 2014/0143826 A1 | 5/2014 | Sharp et al. | |

OTHER PUBLICATIONS

GSM Association, "Embedded SIM Remote Provisioning Architecture" GSM Association Official Document 12FAST.13 V1.1 [online], Dec. 17, 2013. URL: (http://www.gsma.com/connectedliving/wp-content/uplssds/2014/01/I. GSMA-Embedded-SIM-Remote-Provisioning-Architecture-Version-1d1.pdf), 84 pages.

* cited by examiner

ENFORCING SERVICE POLICIES IN EMBEDDED UICCS

CROSS-REFERENCE TO RELATED APPLICATIONS

The present application is a continuation of U.S. application Ser. No. 14/831,819, filed Aug. 20, 2015, entitled "ENFORCING SERVICE POLICIES IN EMBEDDED UICCs," set to issue as U.S. Pat. No. 9,942,755 on Apr. 10, 2018, which claims the benefit of U.S. Provisional Application No. 62/041,613, entitled "ENFORCING SERVICE POLICIES IN EMBEDDED UICCS", filed Aug. 25, 2014, and U.S. Provisional Application No. 62/117,404, entitled "ENFORCING SERVICE POLICIES IN EMBEDDED UICCS", filed Feb. 17, 2015, the contents of which are incorporated herein by reference in their entirety for all purposes.

FIELD

The described embodiments set forth a technique for enforcing service policies in embedded Universal Integrated Circuit Cards (eUICCs) that manage electronic Subscriber Identity Modules (eSIMs).

BACKGROUND

Most mobile devices are configured to receive removable Universal Integrated Circuit Cards (UICCs) that enable the mobile devices to access services provided by mobile network operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a subscriber identity module (SIM) card) that is configured to be inserted into a UICC-receiving bay included in a mobile device. In more recent implementations, however, UICCs are being embedded directly into system boards of mobile devices. Notably, these embedded UICCs (eUICCs) can provide several advantages over traditional, removable UICCs. For example, some eUICCs include a rewritable memory that can facilitate eSIM updates for accessing extended features provided by MNOs. eUICCs can also eliminate or reduce the need for UICC-receiving bays within mobile devices. The implementation of eUICCs, therefore, not only increases the flexibility of mobile devices, but also simplifies their design and frees up space for other components.

SUMMARY

One embodiment sets forth a method for implementing a subsidy lock on a mobile device. The method includes the steps of, at an embedded Universal Integrated Circuit Card (eUICC) included in the mobile device: (1) receiving a request to install or enable an electronic Subscriber Identity Module (eSIM) on the eUICC, (2) determining, based on a policy enforced by the eUICC, whether an International Mobile Subscriber Identity (IMSI) associated with the eSIM is valid, (3) when the eSIM is valid, installing or enabling the eSIM on the eUICC, and (4) when the eSIM is not valid, preventing the eSIM from being installed or enabled on the eUICC.

Another embodiment sets forth an alternative method for implementing a subsidy lock on a mobile device. The method includes the steps of, at an embedded Universal Integrated Circuit Card (eUICC) included in the mobile device: (1) receiving a request to install or enable an electronic Subscriber Identity Module on the eUICC, (2) identifying, based on a policy enforced by the eUICC, whether a combination of a Mobile Country Code (MCC) and a Mobile Network Code (MNC) included in an International Mobile Subscriber Identity (IMSI) associated with the eSIM is valid, (3) when the combination is valid, installing or enabling the eSIM on the eUICC, and (4) when the combination is not valid, preventing the eSIM from being installed or enabled on the eUICC.

Yet another embodiment sets forth an alternative method for implementing a subsidy lock on a mobile device. Specifically, the method includes the steps of, at a baseband component included in the mobile device: (1) receiving, from an embedded Universal Integrated Circuit Card (eUICC) included in the mobile device, a request to register with a Mobile Network Operator (MNO) using an electronic Subscriber Identity Module (eSIM) managed by the eUICC, (2) generating an encryption challenge, (3) issuing, to the eUICC, a request for a digitally-signed package that includes: (i) the encryption challenge, and (ii) a Mobile Country Code (MCC) and a Mobile Network Code (MNC) included in an International Mobile Subscriber Identity (IMSI) that is associated with the eSIM, (4) attempting to authenticate the digitally-signed package based on a digital certificate that is accessible to the baseband component, (5) when the digitally-signed package is authenticated, registering with the MNO in accordance with the eSIM, and (6) when the digitally-signed package is not authenticated, ignoring the request to register with the MNO.

Further embodiments set forth a method for maintaining a threshold number of electronic Subscriber Identity Modules (eSIMs) managed by an embedded Universal Integrated Circuit Card (eUICC). The method includes the steps of, at the eUICC: (1) receiving a request to install an electronic Subscriber Identity Module on the eUICC or to delete the eSIM from the eUICC, (2) determining that eSIM quantity rules are included in a policy that is enforced by the eUICC, (3) when installing or deleting the eSIM does not violate the eSIM quantity rules, based on the request, installing or deleting the eSIM, and (4) when installing or deleting the eSIM violates the eSIM quantity rules, based on the request, preventing the installation or deletion of the eSIM.

Still further embodiments set forth a method for ensuring at least one electronic Subscriber Identity Module (eSIM) is enabled on an embedded Universal Integrated Circuit Card (eUICC). The method includes the steps of: at the eUICC: (1) receiving a request to delete or disable an eSIM on the eUICC, (2) when the eUICC manages only the eSIM, and no other eSIMs, preventing the deletion or disablement of the eSIM, and (3) when only one eSIM is enabled within the eUICC, and at least one other eSIM is managed by the eUICC: enabling the at least one other eSIM, and based on the request, deleting or disabling the eSIM.

Still further embodiments set forth a method for controlling a manner in which electronic Subscriber Identity Modules (eSIMs) are managed by an embedded Universal Integrated Circuit Card (eUICC). The method includes the steps of, at the eUICC: (1) receiving a request to delete or disable an eSIM on the eUICC, where the request includes management credentials that are associated with the eSIM, (2) determining whether the management credentials permit the deletion or disablement of the eSIM, (3) when the management credentials permit the deletion or disablement of the eSIM, based on the request, deleting or disabling the eSIM, and (4) when the management credentials do not permit the deletion or disablement of the eSIM, ignoring the request.

Still further embodiments set forth a method for configuring an embedded Universal Integrated Circuit Card (eUICC) to conditionally require, when performing management operations in association with electronic Subscriber Identity Modules (eSIMs), human-based authentication. The method is implemented by the eUICC, and includes the steps of: (1) receiving a request to perform a management operation in association with an eSIM, (2) determining that (i) a policy being enforced by the eUICC, and/or (ii) a property of the eSIM, indicates that a human-based authentication is required prior to performing the management operation, (3) causing the mobile device to provide a prompt in accordance with the human-based authentication, (4) receiving a response to the prompt for the human-based authentication, and (5) performing the management operation or ignoring the request in accordance with the response.

Still further embodiments set forth a method for configuring an embedded Universal Integrated Circuit Card (eUICC) to conditionally require, when performing management operations in association with electronic Subscriber Identity Modules (eSIMs), human-based authentication. The method is implemented at the eUICC, and includes the steps of (1) receiving a request to perform a management operation in association with an eSIM, (2) determining that a policy being enforced by the eUICC indicates that a human-based authentication is required prior to performing the management operation, (3) causing the mobile device to provide a prompt in accordance with the human-based authentication, (4) receiving a response to the prompt for the human-based authentication, and (5) in accordance with the response: performing the management operation or ignoring the request.

Other embodiments the set forth hardware components that are configured to carry out the various techniques set forth herein. Further embodiments set forth a non-transitory computer readable storage medium configured to store instructions that, when executed by a processor, cause the processor to carry out the various techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Figure 1:
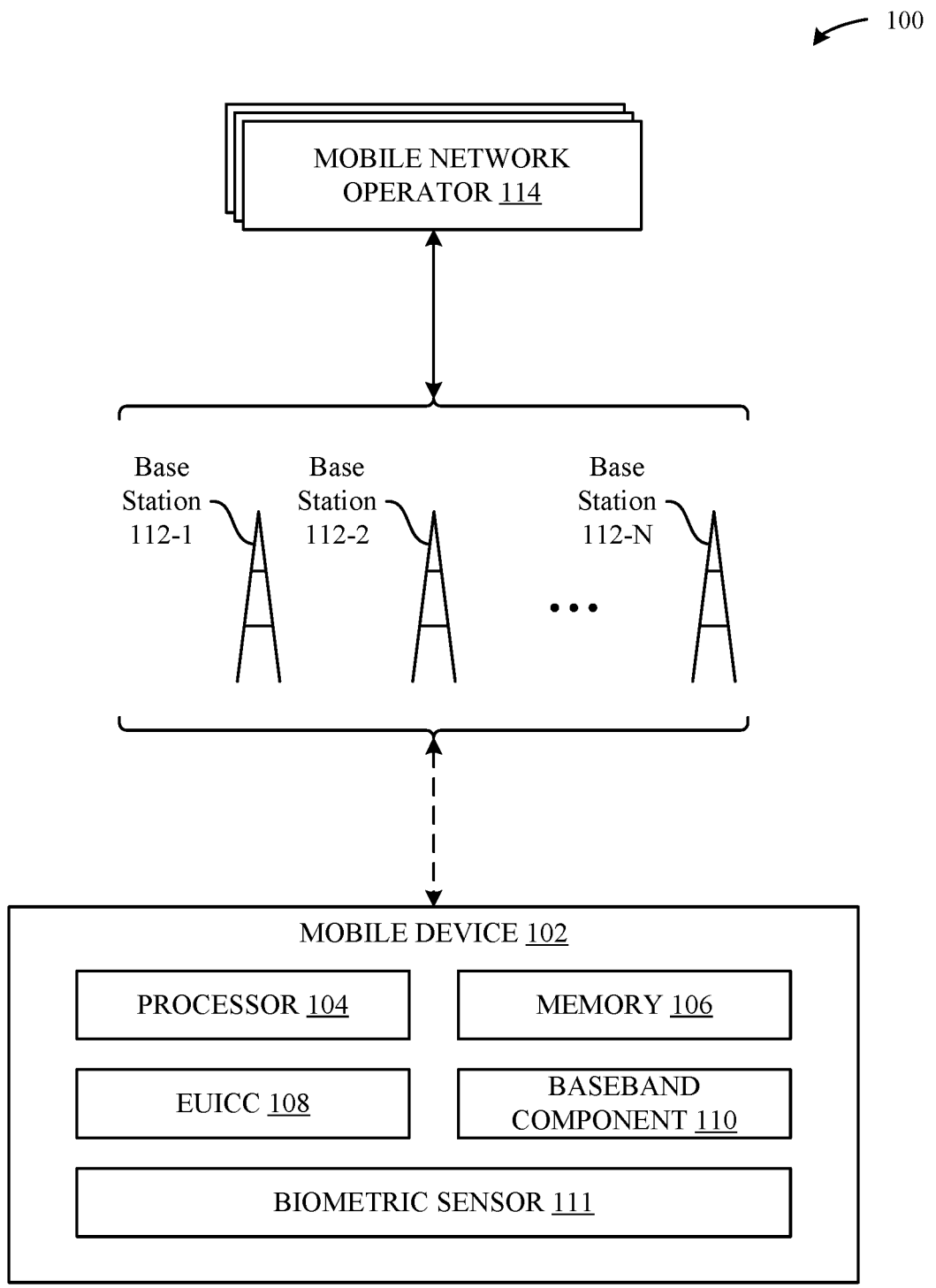
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102 and a group of base stations 112 that are managed by different MNOs 114. According the illustration of FIG. 1, the mobile device 102 can represent a mobile computing device (e.g., an iPhone® or an iPad® by Apple®), the base stations 112 can represent different access network equipment for wireless network(s) that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a processor 104, a memory 106, an eUICC 108, and a baseband component 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store an eSIM for each MNO 114 to which mobile device 102 is subscribed, and, in some cases, can enable two or more of the eSIMs to be active within the mobile device 102 so that the mobile device 102 can simultaneously access the different services provided by the MNOs 114. Although not illustrated in FIG. 1, the mobile device 102 can also be configured to include a receiving bay for a removable UICC that manages one or more SIMs. In this manner, the mobile device 102 can be further configured to provide the benefit of multi-MNO connectivity using a variety approaches, e.g., activating one eSIM managed by the eUICC 108 to connect to a first MNO 114 and activating another SIM managed by a removable UICC to connect to a second MNO 114.

As also shown in FIG. 1, the mobile device 102 can include a biometric sensor 111 to perform authentication techniques that establish, at least to a reliable degree, whether or not a human is operating the mobile device 102. For example, the biometric sensor 111 can be configured to authenticate a user through signature dynamics, which involves prompting a user to provide a signature (e.g., using a stylus) and gathering information (e.g., pressure and writing speed) as the signature is provided. The biometric sensor 111 can also be configured to authenticate a user through typing patterns, which involves prompting a user to input a sequence of words (e.g., using a keyboard) and gathering information (e.g., typing rate, typing patterns, etc.) as the words are input. The biometric sensor 111 can also be configured to authenticate a user through fingerprint recognition, which involves prompting a user to provide his or her fingerprint (e.g., using a fingerprint scanner) and gathering information (e.g., a detailed image) about the fingerprint. The biometric sensor 111 can further be configured to authenticate a user through voice recognition, facial recognition, hand and/or palm geometry, eye scans, and the like. It is noted that the biometric sensor 111 is not limited to implementing the foregoing approaches, and that any approach for authenticating a human is within the scope of the embodiments described herein.

Different levels of authentication can be required when attempting to establish whether a human is operating the mobile device 102. For example, a basic level of authentication can involve establishing whether a human is operating the mobile device 102 (e.g., through a provision of a fingerprint) without requiring the human to be specifically known to the mobile device 102. In another example, an intermediate level of authentication can involve establishing, through an issuance of an authentication challenge, whether a human operating the mobile device 102 is specifically known to the mobile device 102. This can involve, for example, prompting the human to provide his or her fingerprint, collecting information associated with the fingerprint, and then comparing the information to previously-stored information managed by the mobile device 102. In yet another example, an advanced level of authentication can involve establishing, through an issuance of multiple authentication challenges (e.g., a fingerprint recognition and a voice recognition), whether a human operating the mobile device 102 is specifically known to the mobile device 102. It is noted that these techniques can also include verifying that a human is a part of a group of humans that are authorized and known to the mobile device 102.

Figure 2:
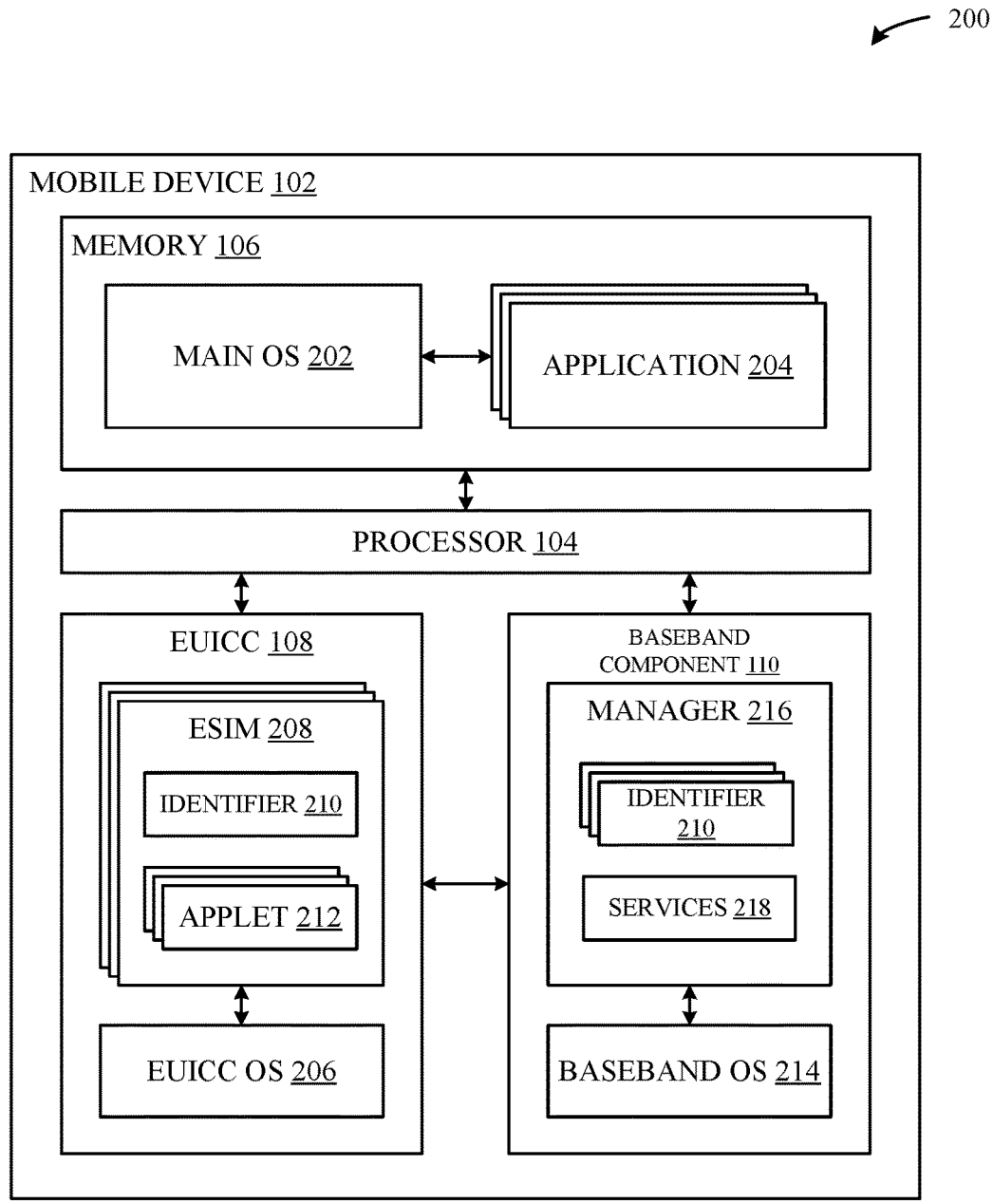
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory). The eUICC OS 206 can also be configured to manage eSIMs 208 that are stored by the eUICC 108, e.g., by activating the eSIMs 208 within the eUICC 108 and providing the baseband component 110 with access to the eSIMs 208. According to the illustration shown in FIG. 2, each eSIM 208 can be associated with a unique identifier 210 and can include multiple applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage the hardware resources of the baseband component 110 (e.g., a processor, a memory, different radio components, etc.). In some embodiments, the baseband component 110 can implement a manager 216 that is configured to interface with the eUICC 108 to implement the various techniques described herein, which include exchanging eSIM capability information with the eUICC OS 206 and managing unique identifiers 210 when the eUICC 108 manages two or more eSIMs 208. As also shown in FIG. 2, the manager 216 can be configured to implement services 218, which represents a collection of software modules that are instantiated by way of the various applets 212 of activated eSIMs 208 that are included in the eUICC 108. For example, services 218 can be configured to manage the different connections that exist between the mobile device 102 and the MNOs 114 according to the different eSIMs 208 that are activated.

Figure 3A:
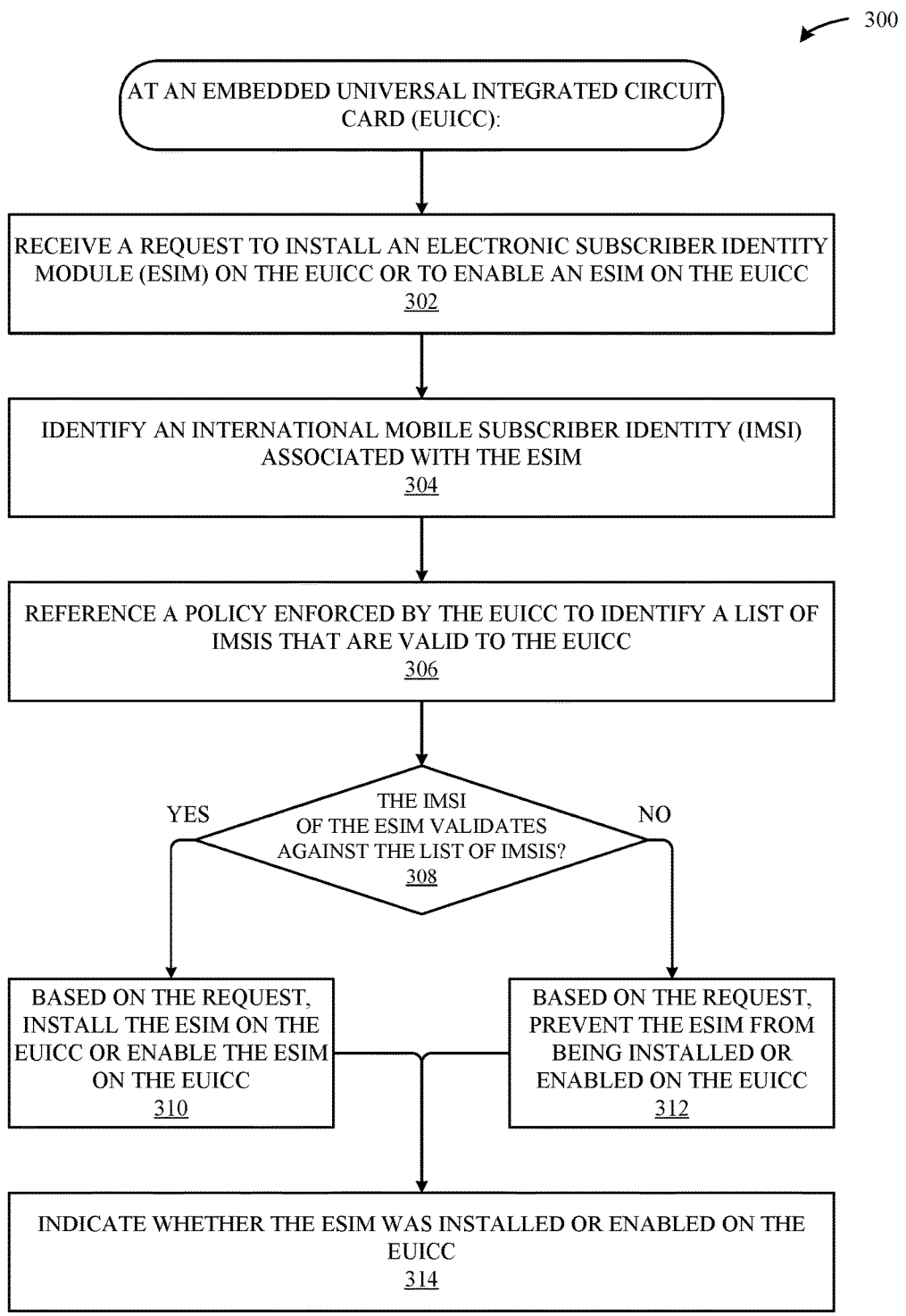
FIG. 3A illustrates a method that is carried out by an eUICC of the mobile device of FIG. 1 and involves implementing a subsidy lock based on IMSI rules set forth in a policy that is enforced by the eUICC, according to some embodiments.

FIG. 3A illustrates a method 300 that can be carried out by the eUICC 108 of the mobile device 102 of FIG. 1, in some embodiments. Specifically, the method 300 involves implementing a subsidy lock based on IMSI rules set forth in a policy that is enforced by the eUICC, according to some embodiments. The method 300 begins at step 302, where the eUICC OS 206 receives a request to install an electronic Subscriber Identity Module (eSIM) or to enable an eSIM on the eUICC.

At step 304, the eUICC OS 206 identifies an International Mobile Subscriber Identity (IMSI) associated with the eSIM. At step 306, the eUICC OS 206 references a policy enforced by the eUICC to identify a list of IMSIs that are valid to the eUICC. According to some embodiments, the list can include complete IMSIs (e.g., 012-234-678901234), as well as partial IMSIs (e.g., IMSIs that define wildcard values (e.g., 310-\*\*\*-\*\*\*\*\*\*\*\*\*)). At step 308, the eUICC OS 206 determines whether the IMSI of the eSIM validates against the list of IMSIs (e.g., the IMSI of the eSIM matches a complete IMSI or partial IMSI included in the list of IMSIs). If, at step 308, the eUICC OS 206 determines that the IMSI of the eSIM validates against the list of IMSIs, then the method 300 proceeds to step 310. Otherwise, the method 300 proceeds to step 312.

At step 310, the eUICC OS 206, based on the request, installs the eSIM or enables the eSIM on the eUICC. Otherwise, at step 312, the eUICC OS 206, based on the request, prevents the eSIM from being installed or enabled on the eUICC. According to some embodiments, step 312 can include, for example, updating a lock state associated with the eSIM. In other embodiments, step 312 can include updating a configuration of the eUICC OS 206 such that the eUICC OS 206 subsequently rejects requests to enable the eSIM. Finally, at step 314, the eUICC OS 206 indicates whether the eSIM was installed or enabled on the eUICC. Specifically, this indication can be directed to, for example, a user of the mobile device 102 of FIG. 1 who is requesting to install or enable the eSIM on the eUICC.

Figure 3B:
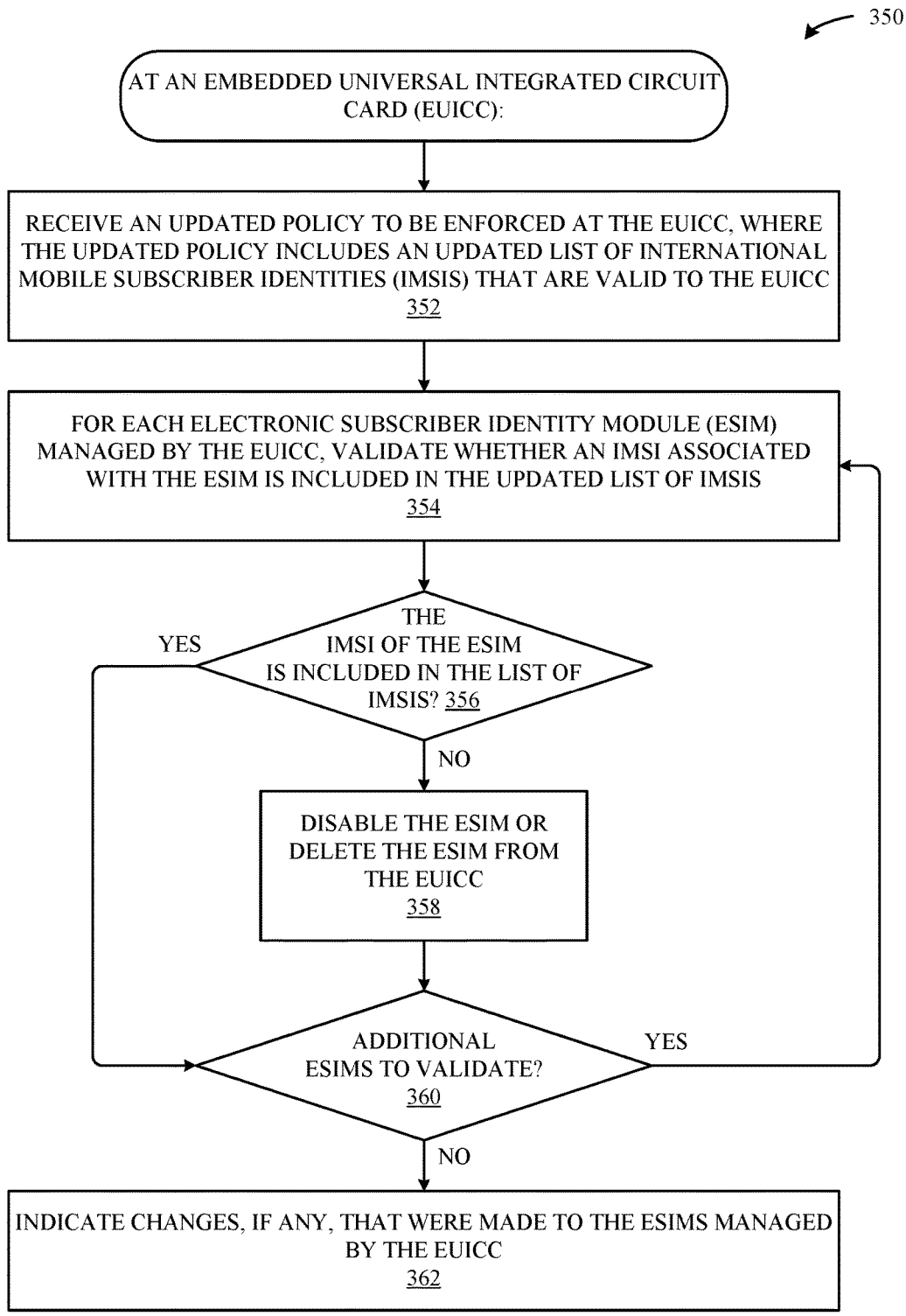
FIG. 3B illustrates a method that is carried out by the eUICC of the mobile device of FIG. 1 and involves performing an update to existing eSIMs managed by the eUICC when an update is made to the policy that is enforced by the eUICC, according to some embodiments.

FIG. 3B illustrates a method 350 that is carried out by the eUICC 108 of the mobile device 102 of FIG. 1. Specifically, the method 350 involves performing an update to existing eSIMs managed by the eUICC when an update is made to the policy that is enforced by the eUICC, according to some embodiments. As shown, the method 350 begins at step 352, and involves the eUICC OS 206 receiving an updated policy to be enforced at the eUICC, where the updated policy includes an updated list of International Mobile Subscriber Identities (IMSIs) that are valid to the eUICC.

At step 354, the eUICC OS 206 for, each electronic Subscriber Identity Module (eSIM) managed by the eUICC, validates whether an IMSI associated with the eSIM is included in the updated list of IMSIs. At step 356, the eUICC OS 206 determines whether the IMSI of the eSIM is included in the list of IMSIs. If, at step 356, the eUICC OS 206 determines that the IMSI of the eSIM is included in the list of IMSIs, then the method 350 proceeds to step 360. Otherwise, the method 350 proceeds to step 358, where the eUICC OS 206 disables the eSIM or deletes the eSIM from the eUICC.

At step 360, the eUICC OS 206 determines whether there are additional eSIMs to validate. If, at step 360, the eUICC OS 206 determines that there are additional eSIMs to validate, then the method 350 proceeds to back to step 354. Otherwise, the method 350 proceeds to step 362. Finally, at step 362, the eUICC OS 206 indicates changes, if any, that were made to the eSIMs managed by the eUICC. This indication can be provided to, for example, an authorized entity (e.g., an MNO or a device manufacturer) that distributes the updated policy to the eUICC.

Figure 4:
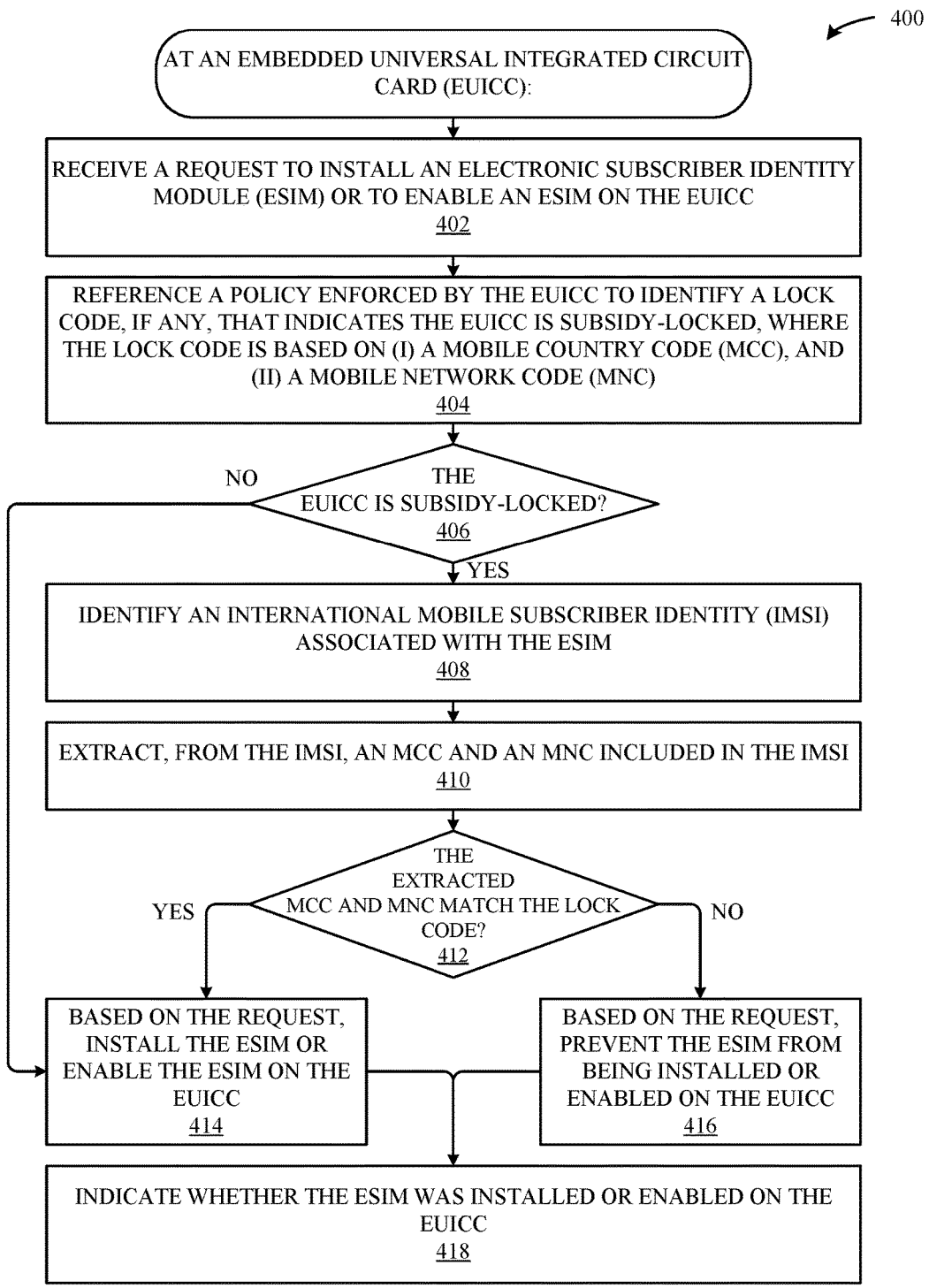
FIG. 4 illustrates a method that is carried out by the eUICC of the mobile device of FIG. 1 and involves implementing a subsidy lock based on IMSI rules set forth in a policy that is enforced by the eUICC, according to some embodiments.

FIG. 4 illustrates a method 400 that is carried out by the eUICC 108 of the mobile device 102 of FIG. 1 and involves implementing a subsidy lock based on IMSI rules set forth in a policy that is enforced by the eUICC, according to some embodiments. As shown, the method 400 begins at step 402, where the eUICC OS 206 receives a request to install an electronic Subscriber Identity Module (eSIM) or enable an eSIM on the eUICC.

At step 404, the eUICC OS 206 references a policy enforced by the eUICC to identify a lock code, if any, that indicates the eUICC is subsidy-locked, where the lock code is based on (i) a Mobile Country Code (MCC), and (ii) a Mobile Network Code (MNC). At step 406, the eUICC OS 206 determines whether the eUICC is subsidy-locked. If, at step 406, the eUICC OS 206 determines that the eUICC is subsidy-locked, then the method 400 proceeds to step 408. Otherwise, the method 400 proceeds to step 414.

At step 408, the eUICC OS 206 identifies an International Mobile Subscriber Identity (IMSI) associated with the eSIM. At step 410, the eUICC OS 206 extracts, from the IMSI, an MCC and an MNC included in the IMSI. At step 412, the eUICC OS 206 determines whether the extracted MCC and MNC match the lock code. If, at step 412, the eUICC OS 206 determines that the extracted MCC and MNC match the lock code, then the method 400 proceeds to step 414. Otherwise, the method 400 proceeds to step 416.

At step 414, the eUICC OS 206, based on the request, installs the eSIM or enables the eSIM on the eUICC. Otherwise, at step 416, the eUICC OS 206, based on the request, prevents the eSIM from being installed or enabled on the eUICC. Finally, at step 418, the eUICC OS 206 indicates whether the eSIM was installed or enabled on the eUICC. In the event that the eSIM was not installed or enabled on the eUICC, the eUICC OS 206 can optionally enter into a mode that permits emergency phone calls to be placed.

Figure 5:
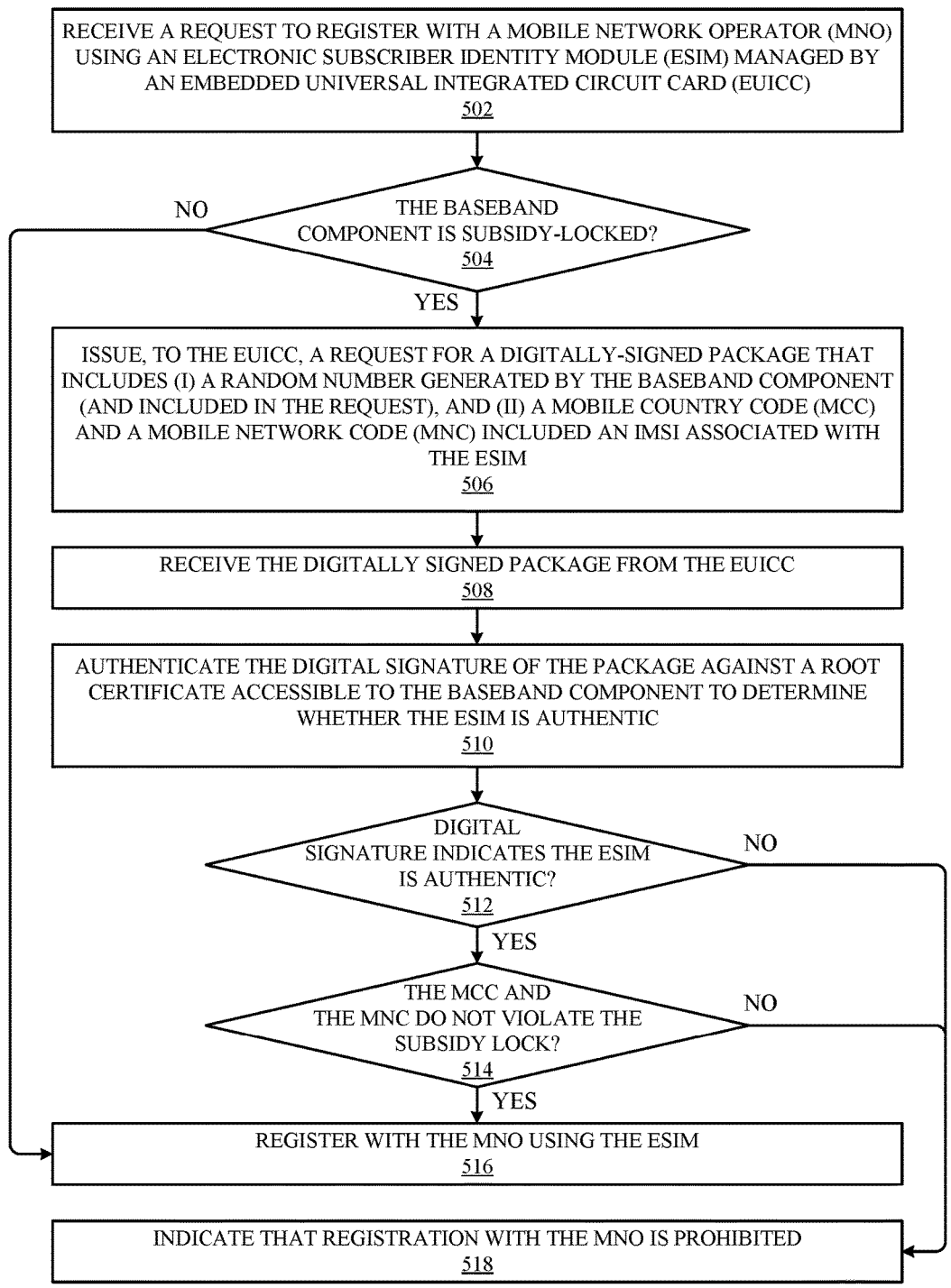
FIG. 5 illustrates a method that is carried out by the baseband component of the mobile device of FIG. 1 and involves challenging the authenticity of an eSIM prior to utilizing the eSIM, according to some embodiments.

FIG. 5 illustrates a method 500 that is carried out by the baseband component of the mobile device 102 of FIG. 1 and involves challenging the authenticity of an eSIM prior to utilizing the eSIM. As shown, the method 500 begins at step 502, where the baseband OS 214 receives a request to register with a Mobile Network Operator (MNO) using an electronic Subscriber Identity Module (eSIM) managed by an embedded Universal Integrated Circuit Card (eUICC). At step 504, the baseband OS 214 determines whether the baseband component is subsidy-locked. If, at step 504, the baseband OS 214 determines that the baseband component is subsidy-locked, then the method 500 proceeds to step 506. Otherwise, the method 500 proceeds to step 516.

At step 506, the baseband OS 214 issues, to the eUICC, a request for a digitally-signed package that includes (i) a random number generated by the baseband component (and included in the request), and (ii) a Mobile Country Code (MCC) and a Mobile Network Code (MNC) included an IMSI associated with the eSIM.

At step 508, the baseband OS 214 receives the digitally signed package from the eUICC. At step 510, the baseband OS 214 authenticates the digital signature of the package against a root certificate (e.g., a digital certificate) accessible to the baseband component to determine whether the eSIM is authentic.

At step 512, the baseband OS 214 determines whether the digital signature indicates the eSIM is authentic. If, at step 512, the baseband OS 214 determines that the digital signature indicates the eSIM is authentic, then the method 500 proceeds to step 514. Otherwise, the method 500 proceeds to step 518. At step 514, the baseband OS 214 determines whether the MCC and the MNC do not violate the subsidy lock. If, at step 514, the baseband OS 214 determines that the MCC and the MNC do not violate the subsidy lock, then the method 500 proceeds to step 516. Otherwise, the method 500 proceeds to step 518.

At step 516, the baseband OS 214 registers with the MNO using the eSIM. Otherwise, at step 518, the baseband OS 214 indicates that registration with the MNO is prohibited.

Figure 6:
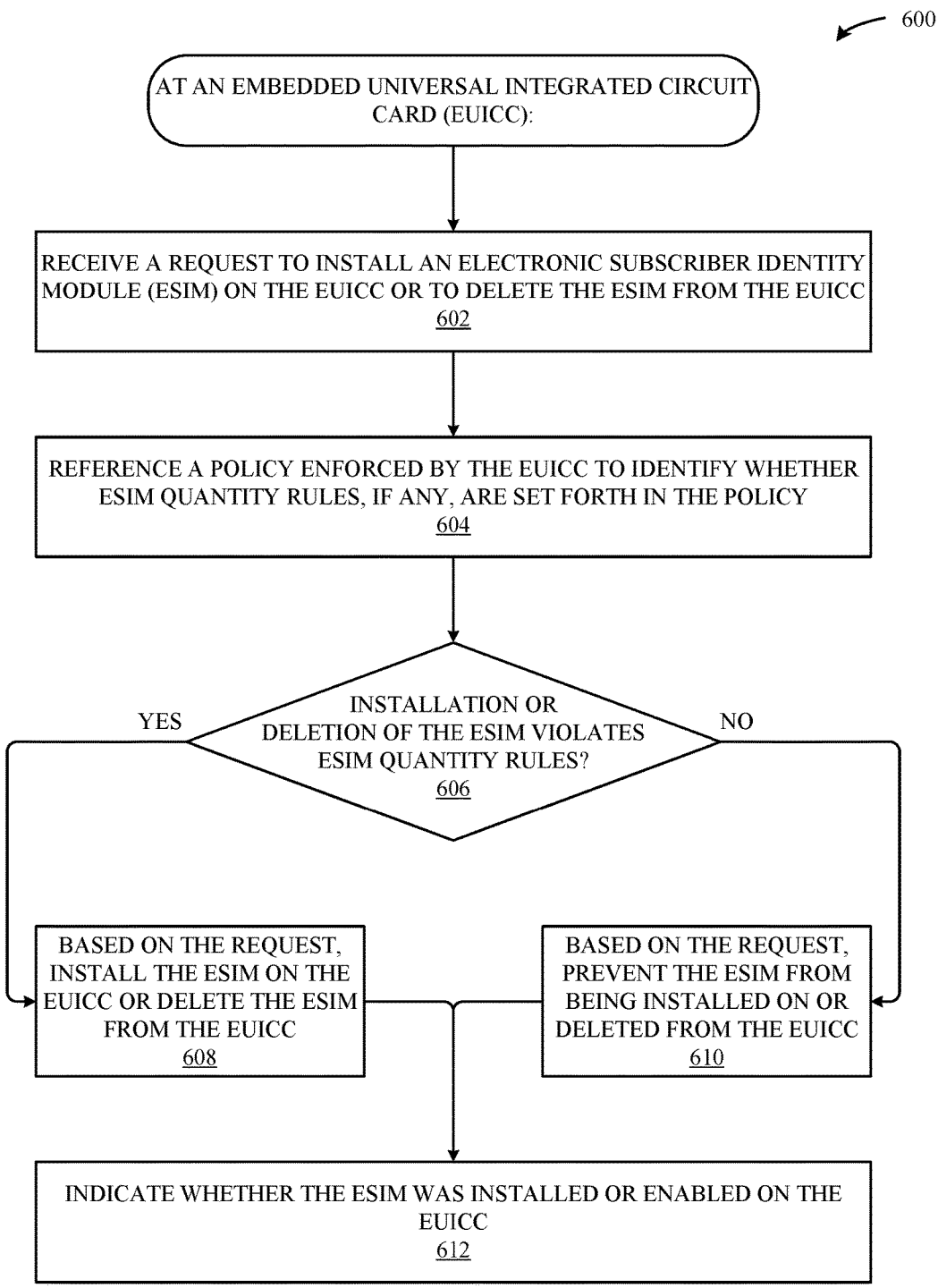
FIG. 6 illustrates a method that is carried out by the eUICC of the mobile device of FIG. 1 and involves limiting the number of eSIMs that are managed by the eUICC, according to some embodiments.

FIG. 6 illustrates a method 600 that is carried out by the eUICC 108 of the mobile device 102 of FIG. 1 and involves limiting the number of eSIMs that are managed by the eUICC, according to some embodiments. As shown, the method 600 begins at step 602, where the eUICC OS 206 receives a request to install an electronic Subscriber Identity Module (eSIM) on the eUICC or delete the eSIM from the eUICC. At step 604, the eUICC OS 206 references a policy enforced by the eUICC to identify whether eSIM quantity rules, if any, are set forth in the policy.

Assuming the eSIM quantity rules are set forth in the policy, at step 606, the eUICC OS 206 determines whether installation or deletion of the eSIM violates the eSIM quantity rules. According to some embodiments, determining whether installing or deleting the eSIM violates the eSIM quantity rules involves analyzing a use-case category (e.g., telecom, non-telecom, etc.) associated with the eSIM. This can involve, for example, the eSIM quantity rules including, for each use-case category of a plurality of use-case categories, a threshold number of eSIMs that are associated with the use-case category and are permitted to be installed on the eUICC.

If, at step 606, the eUICC OS 206 determines that installation or deletion of the eSIM violates the eSIM quantity rules, then the method 600 proceeds to step 608. Otherwise, the method 600 proceeds to step 610. At step 608, the eUICC OS 206, based on the request, installs the eSIM on the eUICC or deletes the eSIM from the eUICC. Otherwise, at step 610, the eUICC OS 206, based on the request, prevents the eSIM from being installed on the eUICC or deleted from the eUICC. Finally, at step 612, the eUICC OS 206 indicates whether the eSIM was installed or enabled on the eUICC.

Figure 7A:
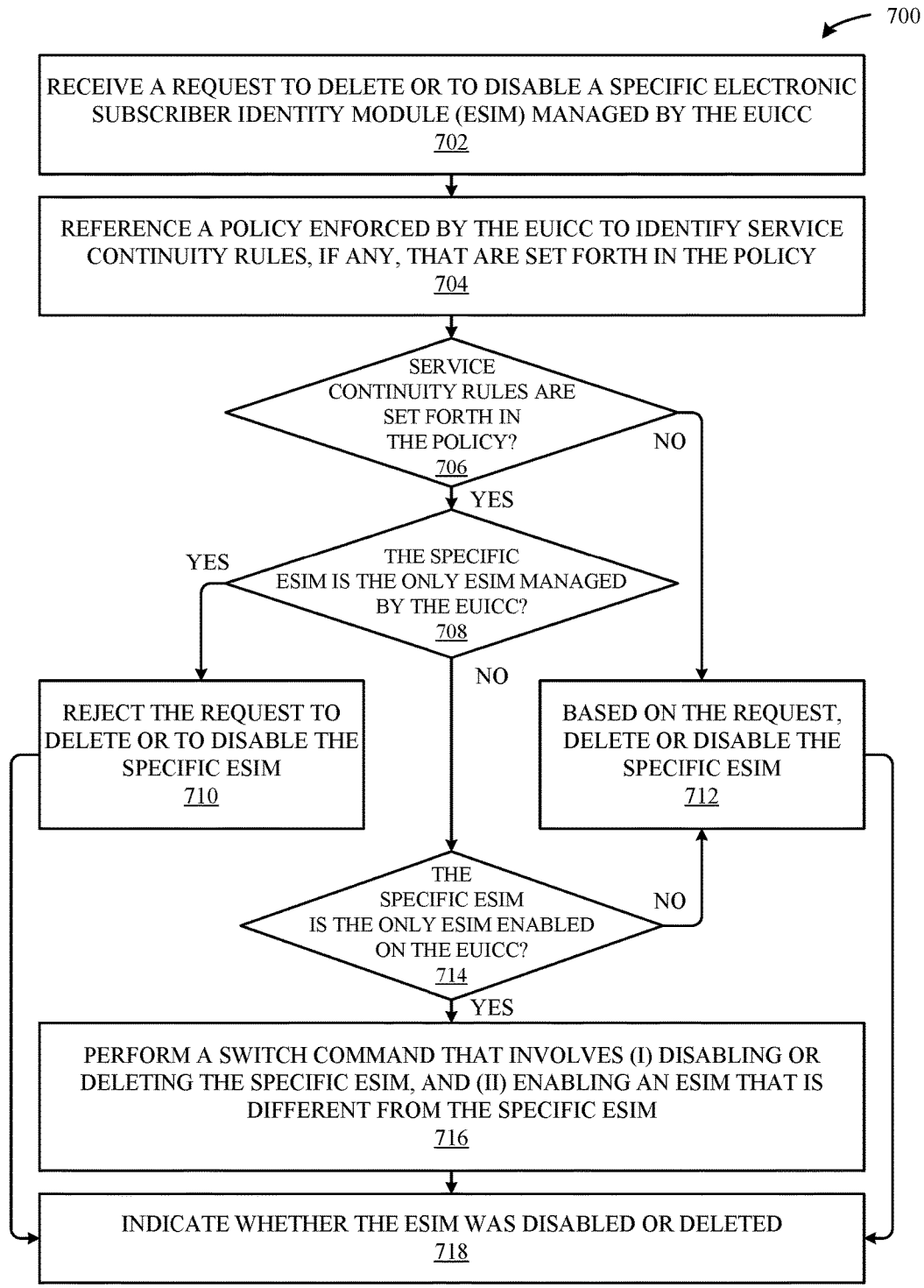
FIG. 7A illustrates a method that is carried out by the eUICC of the mobile device of FIG. 1 and involves ensuring that at least one eSIM is always managed by the eUICC, according to some embodiments.

FIG. 7A illustrates a method 700 that is carried out by the eUICC 108 of the mobile device 102 of FIG. 1 and involves ensuring that at least one eSIM is always managed by the eUICC, according to some embodiments. As shown, the method 700 begins at step 702, where the eUICC OS 206 receives a request to delete or to disable a specific electronic Subscriber Identity Module (eSIM) managed by the eUICC. At step 704, the eUICC OS 206 references a policy enforced by the eUICC to identify service continuity rules, if any, that are set forth in the policy.

At step 706, the eUICC OS 206 determines whether service continuity rules are set forth in the policy. If, at step 706, the eUICC OS 206 determines that service continuity rules are set forth in the policy, then the method 700 proceeds to step 708. Otherwise, the method 700 proceeds to step 712.

At step 708, the eUICC OS 206 determines whether the specific eSIM is the only eSIM managed by the eUICC. If, at step 708, the eUICC OS 206 determines that the specific eSIM is the only eSIM managed by the eUICC, then the method 700 proceeds to step 710. Otherwise, the method 700 proceeds to step 714.

At step 714, the eUICC OS 206 determines whether the specific eSIM is the only eSIM enabled on the eUICC. If, at step 714, the eUICC OS 206 determines that the specific eSIM is the only eSIM enabled on the eUICC, then the method 700 proceeds to step 716. Otherwise, the method 700 proceeds to step 712.

At step 716, the eUICC OS 206 performs a switch command that involves (i) disabling or deleting the specific eSIM, and (ii) enabling an eSIM that is different from the specific eSIM. Finally, at step 718, the eUICC OS 206 indicates whether the eSIM was disabled or deleted.

Figure 7B:
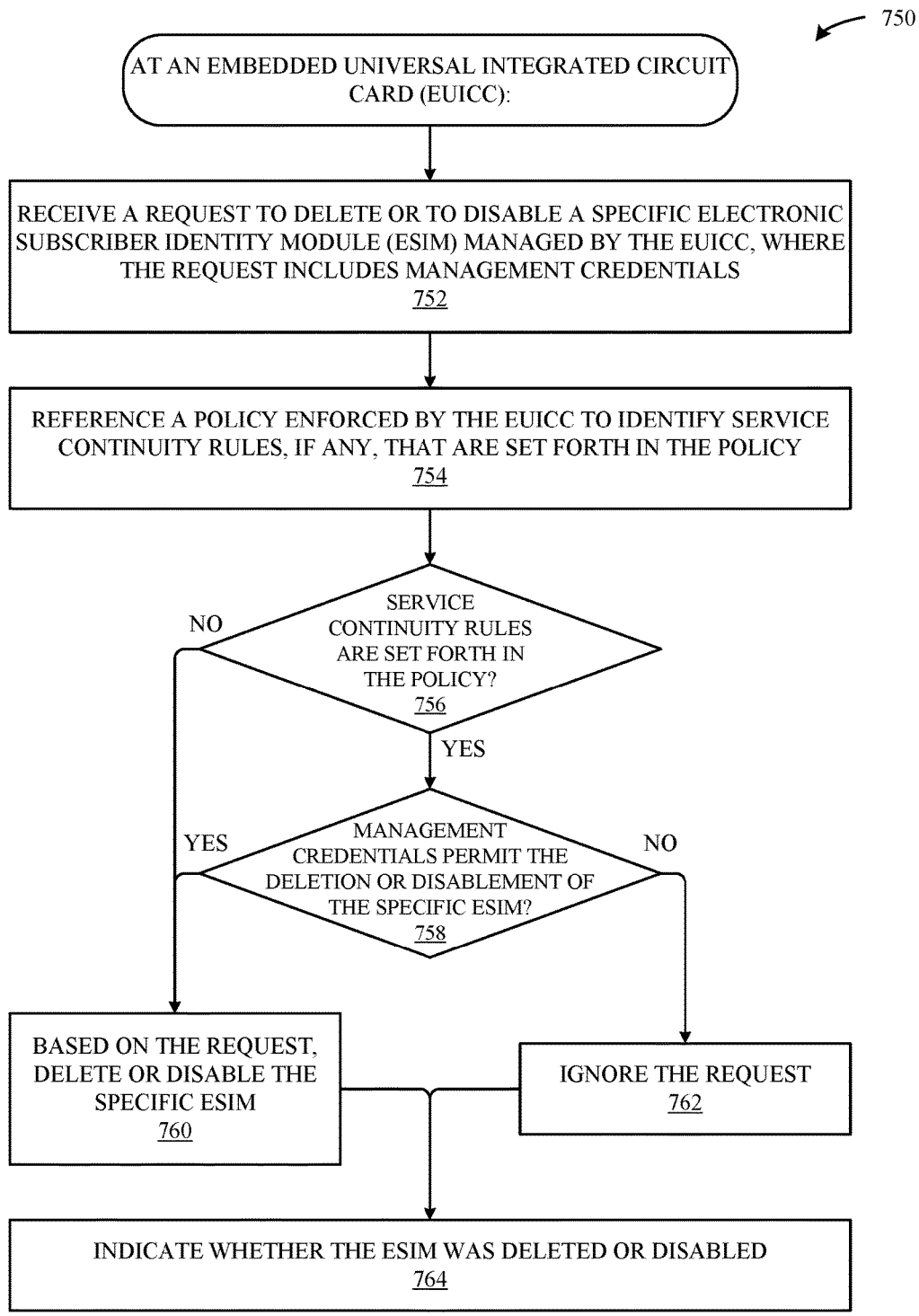
FIG. 7B illustrates a method that is carried out by the eUICC of the mobile device of FIG. 1 and involves utilizing management credentials to ensure that eSIM enablement or deletion is authorized, according to some embodiments.

FIG. 7B illustrates a method 750 that is carried out by the eUICC 108 of the mobile device 102 of FIG. 1 and involves utilizing management credentials to ensure that eSIM enablement or deletion is authorized, according to some embodiments. As shown, the method 750 begins at step 752. Specifically, the eUICC OS 206 receives a request to delete or disable a specific electronic Subscriber Identity Module (eSIM) managed by the eUICC, where the request includes management credentials. At step 754, the eUICC OS 206 references a policy enforced by the eUICC to identify service continuity rules, if any, that are set forth in the policy.

At step 756, the eUICC OS 206 determines whether service continuity rules are set forth in the policy. If, at step 756, the eUICC OS 206 determines that service continuity rules are set forth in the policy, then the method 750 proceeds to step 758. Otherwise, the method 750 proceeds to step 760.

At step 758, the eUICC OS 206 determines whether the management credentials permit the deletion or disablement of the specific eSIM. If, at step 758, the eUICC OS 206 determines that management credentials permit the deletion or disablement of the specific eSIM, then the method 750 proceeds to step 760. Otherwise, the method 750 proceeds to step 762.

At step 760, the eUICC OS 206, based on the request, deletes or disables the specific eSIM. Otherwise, at step 762, the eUICC OS 206 ignores the request. Finally, at step 764, the eUICC OS 206 indicates whether the eSIM was deleted or disabled.

Figure 8:
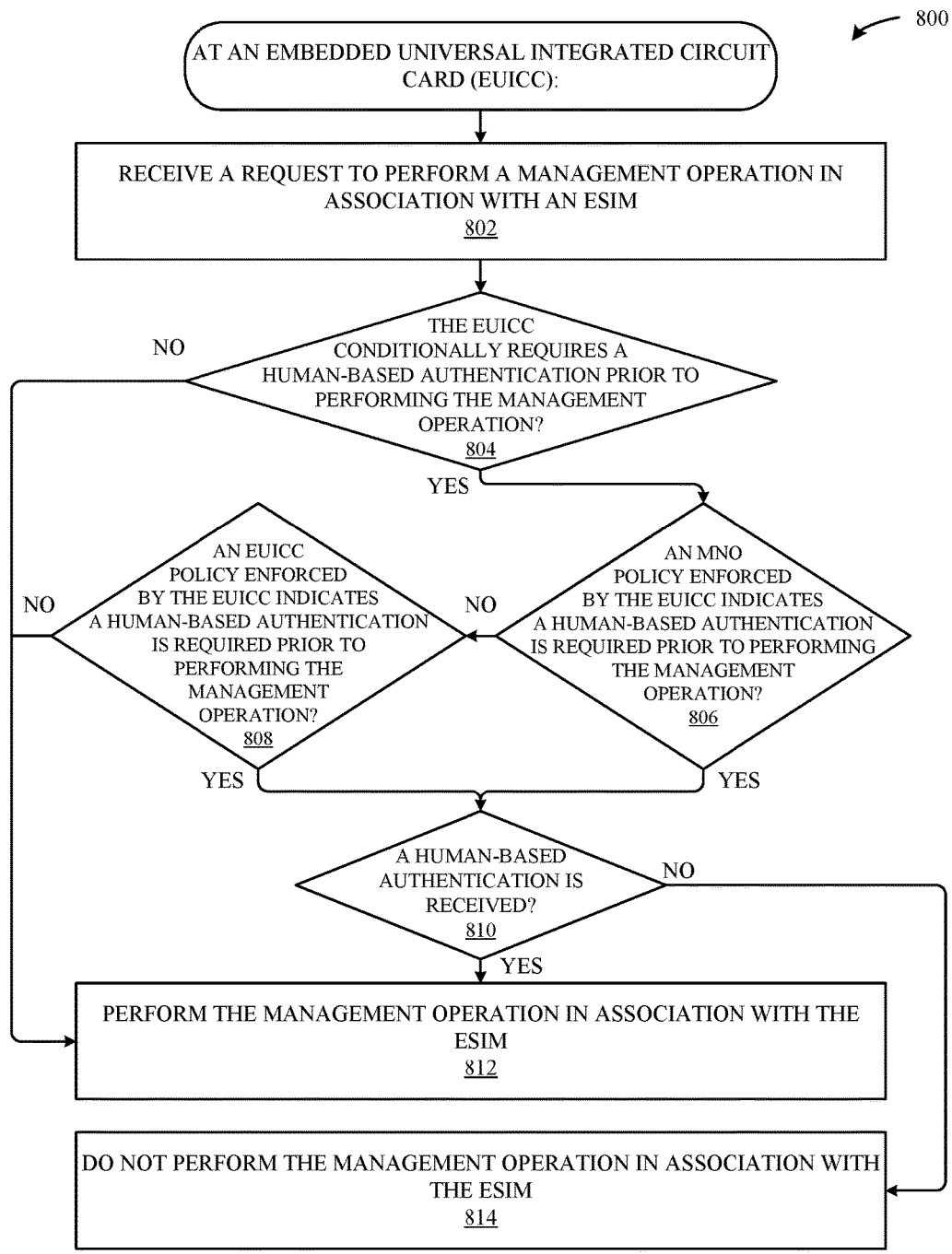
FIG. 8 illustrates a method for requiring, under certain conditions, a human authentication to occur before performing a management operation in association with an eSIM, according to some embodiments.

FIG. 8 illustrates a method 800 for requiring, under certain conditions, a human authentication to occur before performing a management operation associated with an eSIM 208, according to some embodiments. As shown in FIG. 8, the method 800 begins at step 802, where the eUICC 108—specifically, the eUICC OS 206 executing on the eUICC 108—receives a request to perform a management operation associated with an eSIM 208. The management operation can include, for example, importing or exporting an eSIM 208 managed by the eUICC 108, enabling or disabling an eSIM 208 managed by the eUICC 108, installing an eSIM 208 into the eUICC 108 (or uninstalling an eSIM 208 managed by the eUICC 108), loading an eSIM 208 to be used by the eUICC 108 (or unloading an eSIM 208 being used by the eSIM 208), swapping an eSIM 208 with another eSIM 208 managed by the eUICC 108, deleting an eSIM 208 from the eUICC 108, and the like.

At step 804, the eUICC OS 206 determines whether the eUICC 108 conditionally requires a human-based authentication prior to performing the management operation. Various approaches can be used to cause the eUICC 108 to enforce policies that, for example, always require, conditionally require, or do not require a human-based authentication prior to performing management operations. According to some embodiments, at least two different types of policies can be enforced by the eUICC 108: eUICC-based policies, and MNO-based policies, which are described below in greater detail.

An eUICC-based policy can represent a policy that is specific to the eUICC 108 and is enforced by the eUICC 108 alongside MNO-based policies. According to some embodiments, the eUICC 108 can be configured with an eUICC-based policy (e.g., at a time of manufacture of the eUICC 108, through updates made to the eUICC 108, etc.) to cause the eUICC 108 to enforce a level of security that is conducive to the core functionality intended to be provided by the eUICC 108. For example, when the eUICC 108 is installed into an automobile to provide a means for emergency communications, the eUICC 108 can be configured to implement an eUICC-based policy that does not require a human-based authentication when carrying out eSIM 208 management operations. Alternatively, the eUICC 108 can be configured to implement an eUICC-based policy that always requires a human-based authentication when carrying out eSIM 208 management operations. When conflicts exist between eUICC-based policies and MNO-based policies, the eUICC 108 can be configured to exhibit different biases toward the eUICC-based policies and the MNO-based policies. For example, an eUICC-based policy can cause the eUICC 108 to require human-based authentication for all management operations performed in association with eSIMs 208 even when an MNO-based policy enforced by the eUICC 108 indicates that a human-based authentication is not necessary.

An MNO-based policy can represent a policy that is specific to an MNO and is enforced by the eUICC 108 alongside eUICC-based policies. An MNO-based policy can be implemented according to a variety of approaches. According to one approach, MNO-based policies can be stored on and managed by the eUICC 108, where the MNO-based policy is referenced by the eUICC 108 when an eSIM 208 management operation is requested to be carried out. This can involve, for example, the eUICC 108 identifying an MNO that corresponds to the eSIM 208, and referencing MNO-based policies enforced by the eUICC 108 to determine whether a human-based authentication is required prior to carrying out the eSIM 208 management operation. According to another approach, MNO-based policies can be embedded into eSIMs 208, e.g., using properties of the eSIMs 208, where the eUICC 108 is configured to analyze the properties of the eSIM 208 to identify and enforce an MNO-based policy prior to performing the eSIM 208 management operation. This can involve, for example, the eUICC 108 identifying that an eSIM 208—specifically, an MNO associated with the eSIM 208—requires a human-based authentication to be carried out prior to performing the management operation in association with the eSIM 208.

If, at step 804, the eUICC OS 206 determines that the eUICC 108 conditionally requires a human-based authentication prior to performing the eSIM 208 management operation, then the method 800 proceeds to step 806. Otherwise, the method 800 proceeds to step 812, where the eUICC OS 206 performs the management operation in association with the eSIM 208.

At step 806, the eUICC OS 206 determines whether an MNO-based policy enforced by the eUICC 108 indicates a human-based authentication is required prior to performing the management operation. In one example, step 806 can involve the eUICC OS 206 determining that an MNO-based policy enforced by the eUICC OS 206 requires that each and every eSIM 208 management operation requires a human-based authentication (e.g., when the mobile device 102 is subsidy-locked to a specific MNO). In another example, step 806 can involve the eUICC OS 206 identifying an MNO-based policy associated with the eSIM 208 (e.g., via properties associated with the eSIM 208). According to these examples, flexibility can be achieved as MNOs can establish security measures that suit their security requirements. If, at step 806, the eUICC OS 206 determines that an MNO-based policy enforced by the eUICC 108 indicates a human-based authentication is required prior to performing the eSIM 208 management operation, then the method 800 proceeds to step 810, which is described below in greater detail. Otherwise, the method 800 proceeds to step 808.

At step 808, the eUICC OS 206 determines whether an eUICC-based policy enforced by the eUICC 108 indicates a human-based authentication is required prior to performing the management operation. If, at step 808, the eUICC OS 206 determines that the eSIM 208 indicates a human-based authentication is required prior to performing the management operation, then the method 800 proceeds to step 810, which is described below in greater detail. Otherwise, the method 800 proceeds to step 812, where the eUICC OS 206 performs the management operation in association with the eSIM 208.

At step 810, the eUICC OS 206 determines whether a human-based authentication is received. This can involve, for example, utilizing the biometric sensor 111 to determine whether or not a human is operating the mobile device 102. According to some embodiments, the eUICC OS 206 can be configured to require a level of human-based authentication that is commensurate with a level of security that is being enforced by the eUICC OS 206. For example, a particular MNO policy can specify that a fingerprint authentication is required, while properties of an eSIM 208 can specify that a voice authentication is required. Combinations of human-based authentication can also be required, e.g., both a fingerprint authentication and a voice authentication. If, at step 810, the eUICC OS 206 determines that a human-based authentication is received, then the method 800 proceeds to step 812, where the eUICC OS 206 performs the management operation in association with the eSIM 208. Otherwise, the method 800 proceeds to step 814, where the eUICC OS 206 does not perform the management operation in association with the eSIM.

Figure 9:
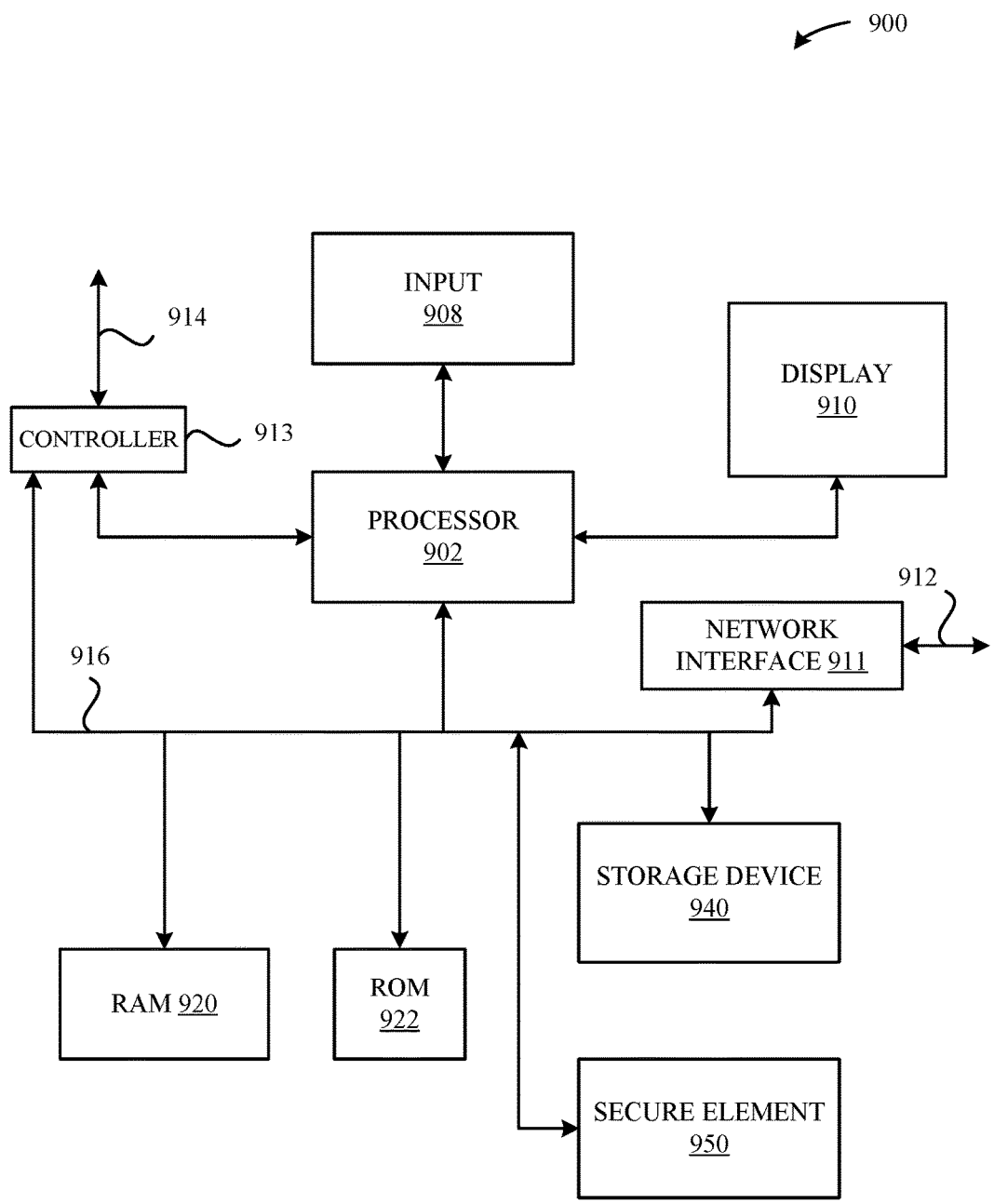
FIG. 9 illustrates a detailed view of a computing device that can be used to implement the various components described herein, according to some embodiments.

FIG. 9 illustrates a detailed view of a computing device 900 that can be used to implement the various components described herein, according to some embodiments. In particular, the detailed view illustrates various components that can be included in the mobile device 102 illustrated in FIG. 1. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data (such as biometric data gathered by the biometric sensor 111 of the mobile computing device 102 of FIG. 1), etc. Still further, the computing device 900 can include a display 910 (screen display) that can be controlled by the processor 902 to display information to the user. A data bus 916 can facilitate data transfer between at least a storage device 940, the processor 902, and a controller 913. The controller 913 can be used to interface with and control different equipment through and equipment control bus 914. The computing device 900 can also include a network/bus interface 911 that couples to a data link 912. In the case of a wireless connection, the network/bus interface 911 can include a wireless transceiver.

The computing device 900 also include a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element 950, which can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for configuring an embedded Universal Integrated Circuit Card (eUICC) included in a mobile device to conditionally require human-based authentication when performing electronic Subscriber Identity Module (eSIM) management operations, the method comprising, at the eUICC:
    receiving a request to perform an eSIM management operation;
    determining that at least one condition of a policy being enforced by the eUICC indicates that a human-based authentication is required prior to performing the eSIM management operation;
    identifying, among a plurality of human-based authentications, a particular human-based authentication that is commensurate with the eSIM management operation;
    causing the mobile device to provide a prompt in accordance with the particular human-based authentication;
    receiving a response to the prompt for the particular human-based authentication; and
    in accordance with the response:
        performing the eSIM management operation or ignoring the request.

2. The method of claim 1, wherein the policy is specific to the eUICC, and the policy is stored in and managed by the eUICC.

3. The method of claim 1, wherein the policy is specific to a Mobile Network Operator (MNO).

4. The method of claim 3, wherein the policy is stored in and managed by the eUICC.

5. The method of claim 3, wherein the policy is defined by properties of the eSIM.

6. The method of claim 1, wherein the eSIM management operation includes one or more of:
    importing the eSIM into the eUICC, exporting the eSIM from the eUICC, enabling the eSIM within the eUICC, disabling the eSIM within the eUICC, installing the eSIM to the eUICC, uninstalling the eSIM from the eUICC, loading the eSIM into the eUICC, unloading the eSIM from the eUICC, swapping the eSIM with another eSIM within the eUICC, or deleting the eSIM from the eUICC.

7. The method of claim 1, wherein the plurality of human-based authentications include: a fingerprint authentication, a voice authentication, a facial authentication, a hand/palm authentication, an eye scan authentication, a challenge authentication, and all combinations thereof.

8. A non-transitory computer readable storage medium configured to store instructions that, when executed by an embedded Universal Integrated Circuit Card (eUICC) included in a mobile device, cause the eUICC to conditionally require human-based authentication when performing electronic Subscriber Identity Module (eSIM) management operations, by carrying out steps that include:
    receiving a request to perform an eSIM management operation;
    determining that at least one condition of a policy being enforced by the eUICC indicates that a human-based authentication is required prior to performing the eSIM management operation;
    identifying, among a plurality of human-based authentications, a particular human-based authentication that is commensurate with the eSIM management operation;
    causing the mobile device to provide a prompt in accordance with the particular human-based authentication;
    receiving a response to the prompt for the particular human-based authentication; and
    in accordance with the response:
        performing the eSIM management operation or ignoring the request.

9. The non-transitory computer readable storage medium of claim 8, wherein the policy is specific to the eUICC, and the policy is stored in and managed by the eUICC.

10. The non-transitory computer readable storage medium of claim 8, wherein the policy is specific to a Mobile Network Operator (MNO).

11. The non-transitory computer readable storage medium of claim 10, wherein the policy is stored in and managed by the eUICC.

12. The non-transitory computer readable storage medium of claim 10, wherein the policy is defined by properties of the eSIM.

13. The non-transitory computer readable storage medium of claim 8, wherein the eSIM management operation includes one or more of:
    importing the eSIM into the eUICC, exporting the eSIM from the eUICC, enabling the eSIM within the eUICC, disabling the eSIM within the eUICC, installing the eSIM to the eUICC, uninstalling the eSIM from the eUICC, loading the eSIM into the eUICC, unloading the eSIM from the eUICC, swapping the eSIM with another eSIM within the eUICC, or deleting the eSIM from the eUICC.

14. The non-transitory computer readable storage medium of claim 8, wherein the plurality of human-based authentications include: a fingerprint authentication, a voice authentication, a facial authentication, a hand/palm authentication, an eye scan authentication, a challenge authentication, and all combinations thereof.

15. An embedded Universal Integrated Circuit Card (eUICC) included a mobile device, the eUICC configured to conditionally require human-based authentication when performing electronic Subscriber Identity Module (eSIM) management operations, the eUICC comprising:
   at least one processor; and
   at least one memory storing instructions that, when executed by the at least one processor, cause the eUICC to:
      receiving a request to perform an eSIM management operation;
      determine that at least one condition of a policy being enforced by the eUICC indicates that a human-based authentication is required prior to performing the eSIM management operation;
      identify, among a plurality of human-based authentications, a particular human-based authentication that is commensurate with the eSIM management operation;
      cause the mobile device to provide a prompt in accordance with the particular human-based authentication;
      receive a response to the prompt for the particular human-based authentication; and
      in accordance with the response:
         perform the eSIM management operation or ignore the request.

16. The eUICC of claim 15, wherein the policy is specific to the eUICC, and the policy is stored in and managed by the eUICC.

17. The eUICC of claim 15, wherein the policy is specific to a Mobile Network Operator (MNO).

18. The eUICC of claim 17, wherein the policy is stored in and managed by the eUICC.

19. The eUICC of claim 17, wherein the policy is defined by properties of the eSIM.

20. The eUICC of claim 15, wherein the plurality of human-based authentications include: a fingerprint authentication, a voice authentication, a facial authentication, a hand/palm authentication, an eye scan authentication, a challenge authentication, and all combinations thereof.

* * * * *